(12) United States Patent
Laurin et al.

(10) Patent No.: US 8,524,177 B2
(45) Date of Patent: Sep. 3, 2013

(54) PROCESS FOR PURIFYING ZINC OXIDE

(75) Inventors: Michel Laurin, Eastman, CA (US);
Stephen C. Paspek, Broadview, OH (US)

(73) Assignee: Canadus Chemical LLC, Twinsburg, OH (US)

( * ) Notice: Subject to any disclaimer, the term of this patent is extended or adjusted under 35 U.S.C. 154(b) by 0 days.

(21) Appl. No.: 13/229,188

(22) Filed: Sep. 9, 2011
(Under 37 CFR 1.47)

(65) Prior Publication Data
US 2013/0064743 A1 Mar. 14, 2013

(51) Int. Cl.
*C22B 19/00* (2006.01)

(52) U.S. Cl.
USPC ............ 423/101; 423/104; 423/109; 423/622

(58) Field of Classification Search
USPC .................. 423/101, 104, 109, 622
See application file for complete search history.

(56) References Cited

U.S. PATENT DOCUMENTS

| | | |
|---|---|---|
| 1,013,511 A | 1/1912 | Pipereaut et al. |
| 1,719,056 A | 7/1929 | Horsch |
| 2,105,394 A | 1/1938 | Allavena |
| 2,446,868 A | 8/1948 | Cunningham |
| 3,424,562 A | 1/1969 | Gaska et al. |
| 3,953,306 A | 4/1976 | Lancy |
| 3,973,949 A | 8/1976 | Goens et al. |
| 3,981,966 A | 9/1976 | Baucom |
| 4,005,061 A | 1/1977 | Lemaire |
| 4,053,552 A | 10/1977 | Clitheroe et al. |
| 4,124,462 A | 11/1978 | Reinhardt et al. |
| 4,193,769 A | 3/1980 | Cheng et al. |
| 4,338,200 A | 7/1982 | Zeijlstra |
| 4,563,256 A | 1/1986 | Sudderth et al. |
| 4,572,771 A | 2/1986 | Duyvesteyn et al. |
| 4,606,765 A | 8/1986 | Ferlay |
| 4,610,722 A | 9/1986 | Duyvesteyn et al. |
| 4,631,176 A | 12/1986 | Kruesi |
| 5,128,047 A | 7/1992 | Stewart et al. |
| 5,208,004 A | 5/1993 | Myerson |
| 5,244,491 A | 9/1993 | Brown et al. |
| 5,246,684 A | 9/1993 | Brown et al. |
| 5,286,465 A | 2/1994 | Zaromb et al. |
| 5,453,111 A | 9/1995 | Myerson et al. |

(Continued)

FOREIGN PATENT DOCUMENTS

EP 0040659 9/1984

OTHER PUBLICATIONS

PCT, International Search Report and Written Opinion, PCT/US2011/056852 (Jan. 27, 2012).
Frenay, J. et al., "Recovery of Lead and Zinc from Electric Steelmaking Dusts by the Cebedeau Process", Met. Soc. AIME, pp. 195-201 (1985).

(Continued)

*Primary Examiner* — Steven Bos
(74) *Attorney, Agent, or Firm* — Thompson Hine LLP

(57) ABSTRACT

A process for separating zinc from a feedstock containing a mixture of metals and metal compounds. The process includes leaching a zinc-containing feedstock with a concentrated basic solution, optionally diluting the slurry with an amount of water sufficient to reduce the viscosity of the slurry thereby facilitating separation of a pregnant liquor containing dissolved zinc from insoluble materials, separating the insoluble materials from the pregnant liquor, and precipitating zinc oxide from the pregnant liquor by adding an anti-solvent to the pregnant liquor. The described process also provides for recycling of the basic solution and the anti-solvent.

31 Claims, 2 Drawing Sheets

(56) References Cited

U.S. PATENT DOCUMENTS

| | | | |
|---|---|---|---|
| 5,464,596 A | 11/1995 | Myerson | |
| 5,571,306 A | 11/1996 | Myerson et al. | |
| 5,582,631 A | 12/1996 | Myerson et al. | |
| 5,759,503 A | 6/1998 | Myerson et al. | |
| 5,942,198 A | 8/1999 | Myerson et al. | |
| 6,036,929 A | 3/2000 | Brown et al. | |
| 6,264,903 B1 | 7/2001 | Myerson et al. | |
| 2008/0124268 A1* | 5/2008 | Yang et al. | 423/511 |
| 2009/0014687 A1* | 1/2009 | Kaskel et al. | 252/301.36 |

OTHER PUBLICATIONS

Jha, M.K. et al., "Review of Hydrometallurgical Recovery of Zinc From Industrial Wastes", Resources Conservation and Recycling, Elsevier Science Publisher, Amsterdam, NL, vol. 33, No. 1, pp. 1-22 (Aug. 1, 2001).

Chang, C.M. et al., "Review of the Galvanic Stripping Process for Use in Treating Oxidized Metal Wastes", Proceedings HSRC/WERC Joint Conference on the Environment, pp. 164-175 (1996).

* cited by examiner

PROCESS FOR PURIFYING ZINC OXIDE

BACKGROUND

Hydrometallurgy is a process for separating valuable metallic species from other less valuable materials. The process involves the dissolution of the valuable metallic species into an aqueous solution, which is then separated from the insoluble residue. To enhance the rate of ion dissolution and to increase the loading of metal ions in the solution, it is common practice to use an acidic or basic solution. An example of a particularly useful basic solution is a mixture of sodium hydroxide in water. Other alkali materials can also be utilized, but the relatively low cost of sodium hydroxide usually makes it the most economical choice.

The aqueous solution loaded with dissolved metals is referred to as a "pregnant liquor." Dissolved metals may be recovered from the pregnant liquor by one or more means, including: electrolysis, neutralization, and immiscible solvent extraction.

Hydrometallurgical methods for recovery of valuable metals have been practiced for decades. The following discussions and examples are based on recovery of zinc oxide from a mixed feedstock material. The basic-soluble zinc oxide is separated from non-basic soluble materials. The non-soluble materials include (but are not limited to) metals and metal oxides such as iron, iron oxide, nickel, cobalt, precious metals, and non-metal oxides such as silica.

There are several processes identified in the literature for recovery of zinc from zinc-containing feedstock mixtures. These processes typically involve three generic steps:

1. Contacting the zinc-containing feedstock with dilute base to selectively solubilize the zinc, usually at elevated temperatures
2. Separating the leach residue from the basic solution by filtration, centrifugation or other means
3. Recovering zinc from the basic solution (pregnant liquor) by electrowinning, neutralization, or other means.

The most difficult step in this process is usually the separation of the leach residue from the pregnant liquor. The fine particles suspended in the pregnant liquor are very difficult to completely remove. Relatively high pregnant liquor viscosity and surface tension make the removal of these fine particles by filtration or centrifugation exceedingly slow. However, if the particles are not essentially completely segregated from the pregnant liquor, then they will contaminate the zinc-rich product in the next step, rendering the entire purification process useless.

An article entitled "Recovery of Lead and Zinc from Electric Steelmaking Dust by the Cebedeau Process", by J. Frenay et al. summarizes commercial and pilot scale attempts to separate zinc from basic-insoluble species. The high viscosity of highly concentrated basic solutions typically limits commercial operations to a maximum concentration of about 25-30 weight percent base.

The cost of hydrometallurgical processing is heavily dependent on the loading or concentration of the dissolved metal species in the pregnant liquor. As the loading is increased, the amount of liquor that must be processed to produce a given amount of product decreases, saving both capital and operating expense.

Higher concentrations of base permit higher loadings of base-soluble metals in solution. However, higher concentrations of base also produce a significantly more viscous solution. This higher viscosity hinders down-stream processing including the separation of the pregnant liquor from the leach residue.

A number of processes have been developed to recover zinc from various waste materials using hydrometallurgy, but few have been commercially successful. In large part, this is due to the high cost of recovering the dissolved metal species from the pregnant liquor. Typical metal recovery strategies include:

- Electrolysis where a flowing electrical current reduces the metal ions to the metal and plates the metal atoms onto an electrode.
- Neutralization of the liquor to a near-neutral pH to precipitate various metallic salts, hydroxides, or oxides.
- Extraction of metallic ions or complexes with an immiscible solvent.

All of these methods of metal recovery are relatively expensive.

- Electrolysis requires large amounts of electrical current to reduce the metal from a higher valence state to metal. Furthermore, if a metal oxide is the desired end-product, then the base metal must be subjected to an oxidation process to create the oxide form.
- Neutralization of the pregnant liquor requires large quantities of reagent. The neutralization process effectively destroys the liquor for further extraction, and creates a waste salt stream that must be disposed of
- Extraction with an immiscible solvent (such as kerosene doped with an organic amine) generally requires a large excess of extraction solvent, and costly post-processing to recover the metal from the immiscible solvent.

U.S. Pat. No. 4,005,061 to Lemaire discloses a method of removing zinc from spent battery zinc/air electrolyte using a miscible solvent. The single material referenced in the '061 patent is characterized as a "waste," however, this chemical system is, in fact, a spent material containing potassium hydroxide and potassium zincate plus a few percent of potassium carbonate and trace impurities. The described system is directed to electrochemical storage cell batteries having a zinc negative electrode and is, therefore, different from and substantially less complex than the metallurgical waste and by-product materials that are the subject of the present application. The electrolyte is spent only because the metallic zinc powder has been oxidized by air to potassium zincate. It has not been mixed with other materials and only one, simple chemical reaction has occurred. Metallurgical wastes and by-products, spent catalysts, etc., on the other hand, are typically complex mixtures containing a number of different chemical elements in significant concentrations, and they often contain a number of different anions as well. The complexity of these materials requires additional process steps to separate the desired compound from impurities and undesirable compounds. Furthermore, there is no indication or suggestion that the described method would be useful in other types of systems, particularly more complex systems, or in the recovery of other amphoteric compounds. The solubilities of different compounds containing amphoteric metals can vary significantly. For example, lead sulfate is only soluble in hot, concentrated sodium hydroxide solution, while zinc sulfate is very soluble in 25% NaOH, even at room temperature. The solubility of halides decreases significantly above about 35% caustic at room temperature.

SUMMARY OF THE INVENTION

The present application relates to a method of recovering zinc and zinc oxide from a mixture of metals, metal oxides, and other materials. The process in accordance with certain embodiments comprises:

1. Dissolution of the zinc into a basic solution, typically of sufficient concentration to dissolve the zinc and yet suppress or prevent dissolution of halogens, salts and other undesirable species.

2. Separation of the basic solution containing the dissolved zinc from the undissolved materials.

3. Purification of the basic solution to remove undesirable non-zinc materials that are soluble in basic solution.

4. Precipitation of the zinc with a soluble anti-solvent such as methanol.

5. Regeneration of the basic solution and the anti-solvent by separation techniques such as distillation or crystallization to recover a basic solution and an anti-solvent suitable for recycling within the process.

A key advantage to this process is that the anti-solvent reduces the solubility of zinc oxide in basic solution without destroying the base. It does not chemically destroy it as would an acid. This makes it possible to easily regenerate both the basic solution and the antisolvent for recycle within the process. An additional advantage of this process is the ability to supersaturate the solution with zinc in the event dilution with water is necessary to enable the separation of solids from the pregnant liquor.

The hydrometallurgical process as disclosed herein can increase the loading of zinc in pregnant liquor streams, thereby increasing the capacity of a hydrometallurgical process, while avoiding large increases in viscosity so that downstream operations can proceed unhindered.

Extraordinarily high concentrations of zinc can be achieved in relatively low viscosity basic solutions by first contacting the zinc or zinc oxide with a concentrated basic solution (if the zinc is metallic, an oxidizing agent must also be added to oxidize the zinc), and then diluting the solution with water to achieve the desired viscosity. In accordance with certain aspects, metal loadings can be obtained that are about 3 to 5 times the metal loading achieved by simply contacting the metal or metal oxide with dilute basic.

One would expect that by adding water to a solution of concentrated base and reducing the concentration of base, the system would become supersaturated in dissolved metallic ion, and precipitation would result. Applicants have demonstrated that quite unexpectedly, the desired metallic ions remain in solution and do not precipitate during subsequent processing.

DETAILED DESCRIPTION

All documents cited are, in relevant part, incorporated herein by reference; the citation of any document is not to be construed as an admission that it is prior art with respect to the present invention.

The following process is described for the recovery of zinc oxide from a mixed feedstock material. One skilled in the art could also apply these techniques to the separation of zinc oxide from other metals and metal oxides, including nickel, cobalt, manganese and copper, whose value would be substantially increased if separated from zinc. The described process may also be utilized to replace conventional purification of zinc during the production of zinc.

The feedstock material containing the zinc is admixed with a basic solution such as a sodium hydroxide solution. If the zinc is metallic, an appropriate oxidizing agent, such as air, must also be added to oxidize the zinc to $Zn^{+2}$. Higher loadings of dissolved metal are usually achieved by higher concentration of base. Bases useful in accordance with the present invention are inorganic bases that are highly soluble in water (at least 25% by weight) and produce an increase in OH but the cation does not form a complex with zinc. Specific examples of bases that can be used include, but are not limited to, alkali metal bases such as sodium hydroxide, lithium hydroxide and potassium hydroxide.

Figure 1:
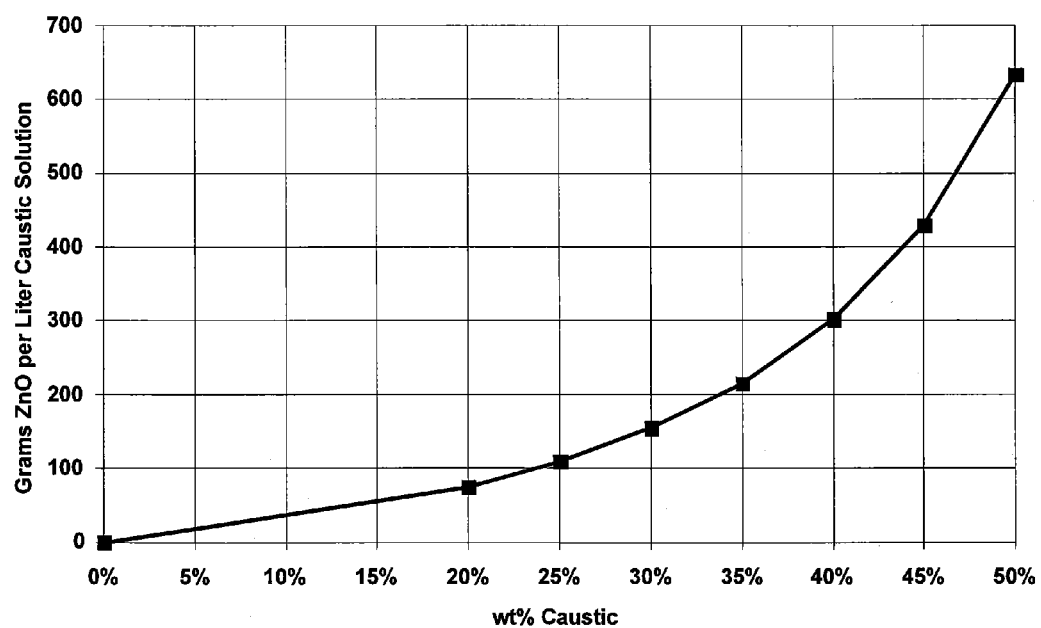
FIG. 1 is a graph of the experimentally determined solubility of zinc oxide in basic solution at varying concentrations of NaOH in water.

FIG. 1 is a graph illustrating the solubility of zinc oxide in basic solution at varying concentrations of NaOH in water.

The reaction of zinc oxide with sodium hydroxide solution can be written as:

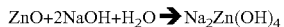

$$ZnO + 2NaOH + H_2O \rightarrow Na_2Zn(OH)_4$$

On a molar basis, two sodium cations are associated with each divalent zincate anion. Therefore, higher concentrations zinc can be dissolved in higher concentrations of base. This dramatically increases the efficiency of the solvent extraction process and results in significantly higher zinc loadings.

The solubility data shown in FIG. 1 clearly indicate the increase in zinc oxide loading that can be obtained by using a higher concentration of basic solution. About a six-fold increase is obtained by increasing the concentration of the basic solution from 25% to 50%. In accordance with certain embodiments, a concentrated sodium hydroxide is used wherein the solution may contain more than 30% wt % NaOH, more than 40 wt % in certain aspects of the invention and in yet other embodiments more than 50 wt % NaOH.

Unfortunately, a solution with 50 wt % base and over 200 grams of dissolved zinc oxide per liter of basic solution is extremely viscous—even at near-boiling temperatures. Removal of suspended fine particles from such a solution is extremely difficult. Although in some cases it is possible to flocculate and settle solids from 50% NaOH solutions containing greater than 200 g/L zinc.

Figure 2:
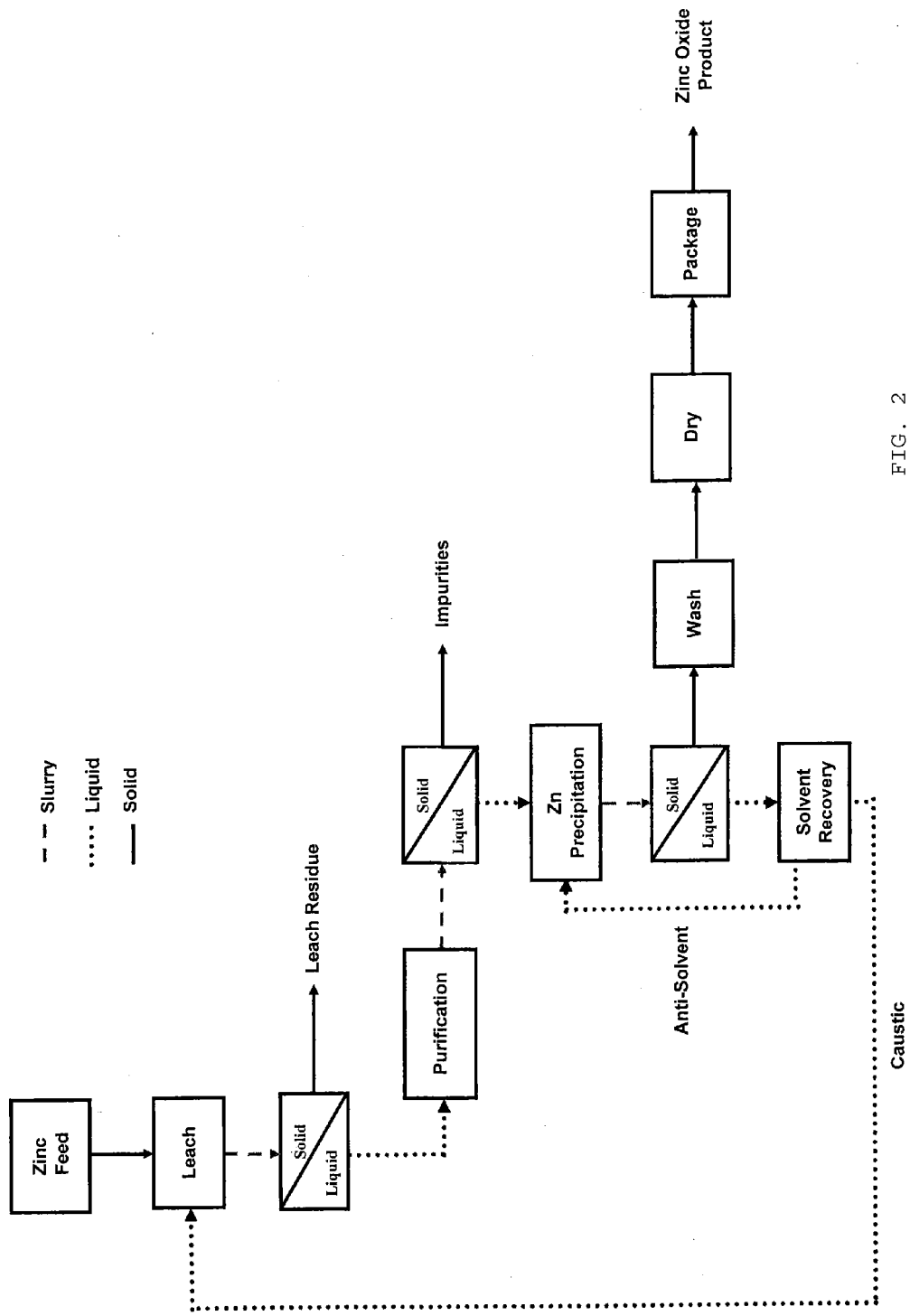
FIG. 2 is a flow chart illustrating a process for recovering zinc oxide in accordance with one embodiment of the invention.

In accordance with the certain aspects of the present invention, high concentrations of complex zinc ions can be achieved in a relatively dilute basic solution by following a specific path or sequence of steps. However, not all aspects of the present invention require a particular sequence of steps. The flow chart provided in FIG. 2 illustrates a process for recovering zinc oxide in accordance with one embodiment of the invention.

Normally, solid-liquid equilibria are path independent. The "end state" is important, and the route to achieve that end state is irrelevant. Unexpectedly, applicants have found that a specific path allows one to produce much higher zinc loadings than expected.

The process takes advantage of three phenomena:

1. Concentrated basic solutions dissolve more zinc than dilute basic solutions.

2. When water is added to a concentrated solution of zinc ions, diluting the basic, the zinc does not readily precipitate.

3. Dilute basic solutions are significantly less viscous and easier to handle and process than concentrated basic solutions.

Thus, by loading the basic solution with zinc at high basic concentrations and then diluting the solution with water to lower the base concentration, one can produce a solution with both high zinc loading and relatively low viscosity.

The relatively low viscosity allows for facile down stream processing, including solid-liquid separation (sedimentation, centrifugation, filtration, etc.).

A basic solution at 50 wt % NaOH is saturated with zinc at about 600 grams of zinc oxide per liter of basic solution. The solution may be diluted with water to an equivalent basic concentration of 35 wt % NaOH. The final solution created by following this path contains about 420 grams of zinc oxide per liter of basic solution. By comparison, initially dissolving the zinc oxide in a basic solution at 35 wt % NaOH, only about 220 grams of zinc oxide are dissolved per liter of basic solution. Dilution to 35% NaOH reduces the viscosity of the solution and improves the separation of solid residues from the pregnant liquor but does not significantly increase the solubility of impurities such as halide salts.

In accordance with one embodiment of the present invention, a zinc loading about three times greater than the zinc loading possible by simply starting with a caustic solution at 25 wt % base can be obtained. Even greater ultimate zinc loadings can be achieved by using a caustic solution with more than 50 wt % base. The maximum concentration of base and zinc is limited only by processing considerations, such as excessive viscosity.

There is also no specific requirement to dilute the concentrated solution to only 25 wt % basic concentration. Depending on the down stream processing equipment requirements, one must only add sufficient water to reduce the viscosity to the desired level. From a practical standpoint, the solution typically will be diluted to a concentration of from about 15-30 wt % basic concentration. In other cases, the solution may be diluted to a concentration of from about 30-35% basic concentration. This higher basic solution, for example, may be particularly useful if halogens are to be separated from zinc. Of course, concentrations outside the specified range are also within the scope of the present invention.

As disclosed herein, water can be added to a concentrated solution of sodium zincate providing dilution and a reduction in viscosity to occur without precipitating any zinc-bearing particulates. The zinc ions remain in solution at concentrations far greater than predicted by the solubility curve provided in FIG. 1. This allows the more facile separation of suspended particles from the pregnant liquor while retaining a high zinc loading in solution.

In some aspects further processing may be accomplished without dilution of the pregnant liquor. In accordance with other embodiments, the pregnant liquor may be diluted by the addition of an amount of water up to 30% of the weight of the original NaOH solution to provide a low viscosity solution which facilitates further solid liquid separation. The pregnant liquor may be diluted with sufficient water to reduce the slurry viscosity by at least 10%, and in accordance with certain aspects of the invention by at least 50% and in yet other aspects by at least 75%.

High zinc loadings are important in the design of a hydrometallurgical plant. The rate of dissolution also generally increases with increasing solution temperature and increasing mixing intensity, both of which favor increased mass transfer from the solid to the liquid. The higher the zinc loading, the less the circulating basic rate required for recovery of a given quantity of zinc. A reduction in circulating basic rate has a major impact on both capital and operating cost.

The pregnant liquor (basic solution containing the dissolved zinc) can be separated from the residual material by any number of commercially available techniques including sedimentation, centrifugation, and filtration.

Although the pregnant liquor has been diluted, the resultant metal loading is still above the metal loading that could have been achieved if the solution had not previously been so highly concentrated during the extraction step of the process. In short, the solution is super-saturated. By creating such a super-saturated solution, one can increase processing efficiency by minimizing the amount of pregnant liquor that must be processed per unit of metal recovered.

To reduce the quantity of material that must be handled, the pregnant liquor may be reconstituted, after impurities have been removed, to a base concentration of at or near the initial concentration. As used herein, the term "reconstituted" means increasing the base concentration of the pregnant liquor to levels approaching those of the initial leaching solution. In accordance with certain embodiments, the pregnant solution is reconstituted to obtain a base concentration of greater than about 25%. In accordance with particular embodiments the base concentration is reconstituted to greater than about 30%, greater than about 35%, more particularly greater than about 40% and in certain embodiments about 50% to greater than 50% basic. By reconstituting the pregnant liquor to higher concentrations of base, the amount of solution that must be processed is reduced and the amount of anti-solvent required to precipitate the zinc oxide is also reduced. Reconstituting the solution to obtain a more concentrated solution can be accomplished in accordance with conventional methods, such as evaporation.

It should be noted that certain dissolved materials such as copper, lead, alumina, silica, some halogens and calcium can be removed from a sodium zincate solution prior to anti-solvent precipitation by known techniques such as precipitation, electrolysis or cementation. This results in the subsequent production of an extremely pure zinc oxide product. The exact purification procedures will depend upon the on the combination of the impurities and the particular properties of the composition. Precipitation with calcium oxide or other alkali metal oxides and cementation with zinc metal are particularly useful methods that may be employed with many common materials. It is not always necessary to filter the leachate before subjecting the composition to cementation and/or precipitation.

Zinc oxide can be precipitated from a pregnant liquor by adding a soluble anti-solvent. Anti-solvents are soluble in the pregnant liquor and effectively force the dissolved zinc to precipitate from the pregnant liquor. A soluble anti-solvent reduces the solubility of zinc in the basic solution, causing the dissolved species to precipitate—usually as the metal oxide, hydroxide, or a mixture of oxides and hydroxides.

Soluble anti-solvent molecules often have a non-polar hydrocarbon part and a polar part containing hetero atoms such as oxygen, nitrogen, or sulfur. It is this polar functionality that allows the anti-solvent to be soluble with the pregnant liquor. Specific examples of anti-solvents useful in the present invention include, but are not limited to, methanol, ethanol, propanol, etc. Methanol is particularly useful and produces precipitation of the dissolved species at relatively low quantities.

The soluble anti-solvent lowers the solubility of dissolved species in the pregnant liquor, causing them to precipitate. However, the soluble anti-solvent does not permanently neutralize or destroy the basic components of the solution. Rather, it forms a new solution that can easily be separated to regenerate both the basic solution and the anti-solvent.

The precipitation step is best carried out well below the boiling point of the anti-solvent to avoid excessive vaporization of the anti-solvent. Optimum temperature and pressure are a function of the physical properties of the anti-solvent.

The amount of metal precipitated (as a percentage of the total metal in solution) typically increases as the amount of anti-solvent increases. The amount of anti-solvent required will vary based on the particular processing conditions and anti-solvent used. Typically, about 1 to 5 volumes of anti-solvent per 1 volume of pregnant liquor will causes the precipitation of more than about 90% of the metal oxide in the pregnant liquor.

The actual ratio of soluble anti-solvent to pregnant liquor is a function of the concentration of zinc in solution, the concentration of base in solution, and the desired recovery in the process.

The precipitation begins immediately upon addition of the anti-solvent and is complete within a few minutes. The size of the zinc oxide particles initially formed is <2 μm. If the slurry is allowed to mix before the zinc oxide is separated from the liquid, the size of the particles will increase. This provides a method of producing zinc oxide products of varying particle sizes and specific surface areas. Particle size and specific surface area are important in some uses of zinc oxide.

Generally, the higher the initial concentration of zinc in basic solution and the higher the caustic concentration, the greater percentage of zinc is recovered for a given dosage of anti-solvent.

A simple distillation will generally recover anti-solvents with low to moderate boiling points from the spent pregnant liquor, regenerating both the anti-solvent and the basic solution. Recrystallization and other conventional means can be also used to regenerate the basic solution and anti-solvent. Both the basic solution and the anti-solvent can then be recycled within the process to treat the next batch of feedstock material.

Such a regeneration scheme is significantly less expensive than those involving the destruction of the basic solution through reaction with acid (forming a waste salt solution), followed by the purchase of fresh base to treat the next batch of feedstock material.

Crystallization and membrane separation are examples of regeneration methods that may be used in this step. Other methods of regeneration may also be used as could be determined by one of ordinary skill in the art.

Certain aspects of the present invention are illustrated in more detail by the following non-limiting example.

Specific Example for the Recovery of Zinc Oxide

The feedstock for this demonstration of the process was a baghouse dust from a brass ingot manufacturer. It was processed to recover a very pure zinc oxide as described in detail below.

The feedstock, referred to in the industry as "brass fume," was formed during the production of brass alloys. It contained about 65 wt % zinc, along with lesser amounts of lead, copper, and other materials. The feedstock material was analyzed using ICP (Inductively Coupled Plasma) to determine the concentrations of various metallic species. An analysis of the feedstock can be found in Table 1.

TABLE 1

| ZnO Feed Sample | |
|---|---|
| Material | Results/Units |
| B | 0.34% |
| Cd | 0.18% |
| Cu | 0.62% |
| K | 0.41% |
| Na | 2.14% |
| Pb | 10.75% |
| Si | 0.15% |

TABLE 1-continued

| ZnO Feed Sample | |
|---|---|
| Material | Results/Units |
| Sn | 0.69% |
| Zn | 65.3% |

Others Mg, Al, Cr, Mn, Fe, Bi 0.01-0.1%
Ti, Ni, As, Mo, Ag, Sb, W 0.001-0.01%
Elements looked for but not detected Be, Ca, Co, Ge, In, Nb, Sr, V, Zr Step 1: Dissolution Two hundred grams of this feedstock material was mixed with 650 grams of a basic solution that contained 50% sodium hydroxide by weight. The mixture of feedstock and basic solution was heated to 100° C. for about one hour with continuous stirring. A large portion of the feedstock material dissolved into the basic solution. The calculated zinc loading was in excess of 250 grams of zinc per liter of solution.

After one hour, the solution was cooled to about 50° C., and an additional 325 grams of water were added, reducing the effective basic strength to the equivalent of 33% base. No precipitate was observed. The zinc loading at this point in the process was in excess of 167 grams per liter. Note that the solubility of zinc in a 33% basic solution is only about 145 grams per liter, making this solution super-saturated as described above.

Step 2: Solid—Liquid Separation

The pregnant liquor was separated from the waste material by filtration through a glass fiber filter at room temperature, using a vacuum to enhance the filtration rate. Approximately 10 grams of fine black residue remained on the filter.

Cementation was then used to remove unwanted tin, cadmium, lead, and copper from the pregnant liquor. The slurry was heated to 80° C. for 30 minutes with constant stirring and then about 15 grams of finely powdered zinc metal were mixed into the pregnant liquor. The zinc powder reacted with the lead and copper ions in solution. After 30 minutes, the solids were separated from the pregnant liquor by vacuum filtration.

To insure purity, the cementation procedure above was repeated. Little change in the appearance of the zinc powder was noted during the second cementation, indicating that all metals below zinc in the electromotive series had reacted with the metallic zinc and were removed from the pregnant liquor.

Step 3: Precipitation of Zinc Oxide with Anti Solvent

The pregnant liquor was filtered as before, cooled to room temperature and treated with four volumes of methanol at ambient temperature and pressure. A white precipitate immediately formed upon the addition of the methanol to the pregnant liquor.

The precipitated solids were recovered from the mixture of spent basic solution and anti-solvent by vacuum filtration. The filtrate was first washed with methanol to remove caustic and then washed repeatedly with hot water to remove any residual basic solution or anti-solvent, and was then dried at 100° C. Approximately 150 grams of dry, brilliant white powder were recovered.

The product precipitate was analyzed using ICP (Inductively Coupled Plasma) to determine the concentrations of various metallic species. The sample was only partially washed. Typically, large scale operations that utilize complete washing and purification of the sample would provide samples of higher purity and fewer impurities. Impurities may be decreased to less than 10 ppm. The results for the ZnO product are shown in Table 2.

TABLE 2

| ZnO Product Sample | |
|---|---|
| Material | Results/Units |
| Ca | 0.23% |
| Na | 0.31% |
| Si | 0.28% |
| Zn | 79.1% |

Others Mg, Cr, Sn 0.01-0.1%
B, Al, Mn, Fe, Ni, Cu, As, Sr, Sb, Pb 0.001-0.01%
Elements looked for but not detected
Ag, Be, Bi, Cd, Co, Ge, In, Mo, Nb, Ti, V, W, Zr Step 4: Basic Solution and Anti-Solvent Regeneration The mixture of anti-solvent and spent base was then regenerated by distillation. One stage of distillation resulted in a methanol purity of about 90%. Such a solution of methanol and water has been demonstrated to be an acceptable anti-solvent. If desired, further purification of the methanol can be achieved by rectification in a multi-stage distillation column.

The distillation "bottoms" or heavy liquid product was a basic solution containing about 35 wt % sodium hydroxide. Further heating would cause additional vaporization of water and the concentration of the sodium hydroxide could readily be increased up to 50% (or more) for use in leaching subsequent batches of raw material.

Increasing the net metal loading results in both capital equipment and operating cost savings. Less solution is required to recover the same amount of metal, leading to smaller tanks, pumps, filters, etc. Less thermal energy is also required resulting in lowered operating costs.

By not significantly increasing the viscosity of the pregnant liquor, one is able to continue to utilize the same equipment down-stream of the leaching process with no impediment to mass transfer. This results in a significant increase in production rate throughout the entire hydrometallurgical plant.

What is claimed is:

1. A process for separating zinc oxide from a feedstock containing a mixture of metals and metal compounds comprising the following steps:
    a. leaching, and oxidizing if zinc metal is present, a zinc-containing feedstock with a concentrated inorganic basic solution containing more than 25 wt % base, wherein the base contains a cation that does not form a complex with zinc, to form a slurry comprising a pregnant liquor containing dissolved zinc and insoluble materials;
    b. optionally, diluting the slurry with an amount of water sufficient to reduce the viscosity of the slurry thereby facilitating separation of the pregnant liquor containing dissolved zinc from insoluble materials;
    c. separating the insoluble materials from the pregnant liquor; and
    d. precipitating zinc oxide from the pregnant liquor by adding an anti-solvent to the pregnant liquor.
2. The process of claim 1 further comprising:
    e. recovering the precipitated zinc oxide.
3. The process of claim 2 further comprising:
    f. regenerating said basic solution and said anti-solvent for reuse.
4. The process of claim 3 further comprising:
    g. repeating steps a through f.
5. The process of claim 1 wherein said leaching step is carried out at temperatures greater than ambient temperature and less than or equal to the boiling point of the slurry.
6. The process of claim 1 wherein said leaching step is carried out at temperatures greater than the normal boiling point of the slurry and at pressures greater than 1 atmosphere.
7. The process of claim 1 wherein said basic solution comprises sodium hydroxide.
8. The process of claim 7 wherein the sodium hydroxide solution comprises more than 35% NaOH by weight.
9. The process of claim 1 wherein the pregnant liquor in step b is super-saturated in zinc under the conditions in which the pregnant liquor is processed.
10. The process of claim 1 wherein the slurry is diluted with water to an equivalent concentration of about 15 to 35% basic.
11. The process of claim 10 wherein the slurry is diluted to an equivalent concentration of 25% basic.
12. The process of claim 1 wherein said anti-solvent comprises methanol.
13. The process of claim 12 wherein from about one to five volumes of anti-solvent are added for every one volume of pregnant liquor.
14. The process of claim 13 wherein said anti-solvent causes precipitation of more than about 90% of metal oxide in the pregnant liquor.
15. The process of claim 1 wherein step c further comprises reconstituting said pregnant liquor after separating the pregnant liquor from said insoluble materials.
16. The process of claim 1 further comprising:
    removing unwanted dissolved components from said pregnant liquor.
17. The process of claim 16 wherein said components are removed by at least one of precipitation and cementation.
18. The process of claim 1 wherein said slurry is diluted by the addition of at least 30% water based on the original weight of water in the slurry.
19. A process for separating zinc from a zinc-containing feedstock comprising the following steps:
    a. contacting a zinc-containing feedstock with a concentrated inorganic basic solution comprising a base, wherein the base contains a cation that does not form a complex with zinc, to form a slurry, wherein the slurry comprises undissolved materials and a pregnant liquor containing a super saturated amount of dissolved zinc;
    b. separating the pregnant liquor containing a super-saturated amount of dissolved zinc from insoluble materials;
    c. purifying the pregnant liquor to remove non-zinc materials soluble in the basic solution; and
    d. precipitating zinc oxide from the purified pregnant liquor by adding an anti-solvent to the pregnant liquor.
20. The process of claim 19 further comprising:
    e. recovering the precipitated zinc oxide.
21. The process of claim 20 further comprising:
    f. regenerating said basic solution and said anti-solvent for reuse by subjecting said spent liquor to distillation.
22. The process of claim 21 further comprising:
    g. repeating steps a through f.
23. The process of claim 19 wherein said contacting step is carried out at elevated temperatures.
24. The process of claim 19 wherein said basic solution comprises sodium hydroxide.
25. The process of claim 24 wherein the sodium hydroxide solution comprises more than 35% NaOH by weight.
26. The process of claim 19 wherein said anti-solvent comprises methanol.
27. The process of claim 26 wherein from about one to five volumes of anti-solvent are added for every one volume of pregnant liquor.

28. The process of claim 19 wherein step b comprises a separation method selected from the group consisting of sedimentation, filtration, centrifugation and combinations thereof.

29. The process of claim 19 wherein step b further comprises reconstituting said pregnant liquor after separating the pregnant liquor from said insoluble materials.

30. The process of claim 19 wherein the basic solution comprises from about 25% to 50% base by weight.

31. The process of claim 20 wherein the precipitated zinc oxide is filtered, washed to remove caustic and dried.

* * * * *